United States Patent [19]

Bovee et al.

[11] Patent Number: 5,707,041
[45] Date of Patent: Jan. 13, 1998

[54] FLUID CONTROL VALVE WITH FASTENER FOR CERAMIC VALVE PLUG

[75] Inventors: Loren Lee Bovee, Marshalltown, Iowa; Gary Alan Witt, Sherman, Tex.; David J. Westwater, Albion, Iowa

[73] Assignee: Fisher Controls International, Inc., Clayton, Mo.

[21] Appl. No.: 707,856

[22] Filed: Sep. 9, 1996

[51] Int. Cl.⁶ ............................................. F16K 5/00
[52] U.S. Cl. ................. 251/315.04; 251/298; 251/304
[58] Field of Search ........................... 251/86, 298, 304, 251/315.04, 315.07

[56] References Cited

U.S. PATENT DOCUMENTS

| | | | |
|---|---|---|---|
| 2,998,957 | 9/1961 | Vulliey | 251/86 |
| 3,963,211 | 6/1976 | Myers | 251/298 X |
| 4,074,889 | 2/1978 | Engel | 251/298 |
| 5,305,987 | 4/1994 | Baumann | 251/298 |

OTHER PUBLICATIONS

*Fisher Controls V500 Control Valve*, Bulletin 51.3:V500, pp. 4, 13.

Primary Examiner—John Fox
Attorney, Agent, or Firm—Marshall, O'Toole, Gerstein, Murray & Borun

[57] ABSTRACT

A fluid control valve for use in severe erosive fluid conditions which includes a ceramic plug seat. The ceramic plug seat is mounted to a metal valve element using a tapered mechanical bolt. The tapered portion of the mechanical bolt matches a cone-shaped interior surface portion within the ceramic plug to uniformly distribute the mounting forces within the ceramic plug to prevent cracking of the ceramic plug.

4 Claims, 1 Drawing Sheet

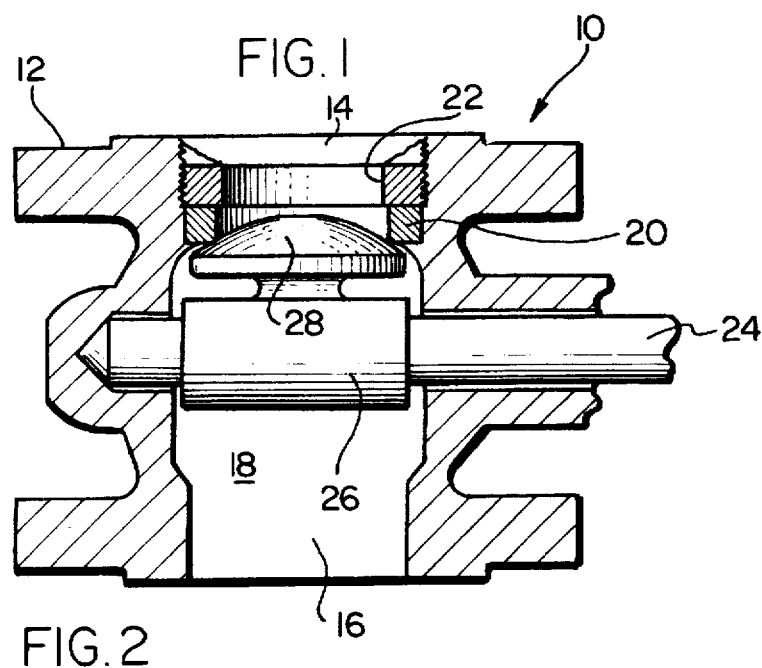
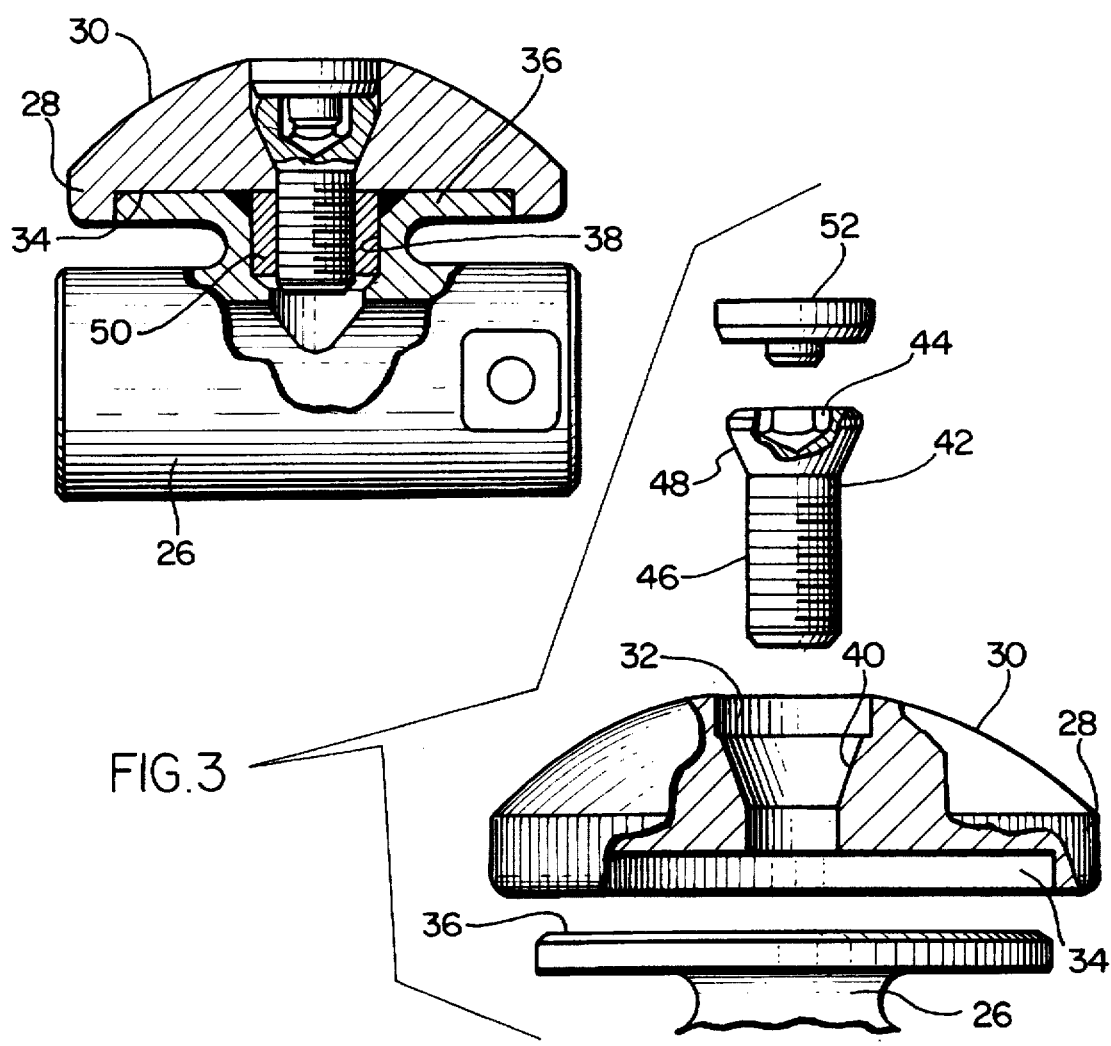

FLUID CONTROL VALVE WITH FASTENER FOR CERAMIC VALVE PLUG

This invention relates to fluid control valves and in particular to such valves used in severe erosive fluid conditions.

BACKGROUND OF THE INVENTION

Fluid flow control valves are utilized for on/off control or throttling the flow of fluid. In certain applications, such control valves must be used in severely erosive fluid conditions which requires the valve components in contact with the fluid to be formed of stainless steel or other alloy materials.

In particular, for instance, in a rotary control valve for use in such severe erosive fluid conditions it is desired to provide a ceramic valve plug to seal against a seat ring and thereby provide a durable, rugged and reliable valve construction. However, in past attempts to mechanically fasten the ceramic plug to the rotary valve element utilizing a standard square-shouldered bolt this has led to cracking of the ceramic plug material which requires removing the valve from service to replace the ceramic plug. It is desired therefore to provide a mechanical fastener connection for ceramic and other high strength semi-brittle materials to thereby provide a more reliable fluid control valve.

SUMMARY OF THE INVENTION

A fluid control valve for use in severe erosive conditions includes a ceramic plug attached to an operating valve member by a mechanical fastener which distributes the mounting forces uniformly through the shape of the ceramic plug. The ceramic plug seat includes a contoured plug seat surface and a central bolt receiving aperture extending through the plug seat. Within the ceramic plug seat, the central bolt receiving aperture includes a cone-shaped interior surface portion.

A threaded mounting bolt has a head and an elongated shank extending from the head. The bolt shank includes a threaded end portion for threadably mounting the ceramic plug seat to the valve operating member. The bolt shank further includes a tapered portion intermediate to the threaded end portion and the bolt head, with the tapered portion matching the cone-shaped interior surface portion within the ceramic plug seat.

The ceramic plug seat is securely fastened to the operating valve element by inserting the threaded mounting bolt into the central bolt receiving aperture and threadably engaging the bolt threads until the tapered portion of the bolt shank is engaged uniformly with the cone-shaped interior surface portion of the ceramic plug seat. The tapered portion of the bolt matched with the cone-shaped interior surface portion of the ceramic plug seat distributes the forces created by the fastener bolt uniformly throughout the shape of the ceramic plug. This provides a stress dispersive mechanical fastener connection for the ceramic plug seat with the metal valve element.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 1 is a sectional elevational view illustrating a fluid control valve for use in severe erosive fluid conditions in accordance with the invention;

FIG. 2 is a sectional, partly fragmented view illustrating a ceramic plug seat included in the fluid control valve of FIG. 1; and FIG. 3 is an exploded view illustrating the mechanical fastener connection for the ceramic plug seat of FIG. 2.

DETAILED DESCRIPTION

Referring now to FIGS. 1–3, there is illustrated a fluid control valve 10 for use in severe erosive fluid conditions. The fluid control valve 10 includes a valve body 12 with a fluid inlet 14 and a fluid outlet 16 interconnected by a valve body passageway 18.

Within the passageway 18 there is mounted a seat ring 20 formed of a durable, solid metal or ceramic material, and maintained in position by a seat ring retainer 22 which is threadably engaged within the valve body 12. A valve operating element, such as a rotating valve shaft 24 is suitably mounted with bearings within the valve body 12. A valve plug hub 26 and a valve plug seat 28 are securely mounted to the valve shaft 24 so as to rotate therewith. Thus, rotating valve shaft 24 controllably positions the valve plug seat 28 with respect to the seat ring 20 to provide either a throttling or an on/off control operation of the fluid passing from fluid inlet 14 to passageway 18 and exiting at the valve body fluid outlet 16. The valve plug seat 28 is formed of ceramic or other semi-brittle material to withstand the corrosive fluids. In accordance with the present invention, a stress dispersive mechanical fastening connection is provided to securely and reliably fasten the ceramic valve plug seat 28 to the metal valve plug hub 26.

With reference to FIGS. 2 and 3, there is illustrated a unique connection between the valve plug seat 28 and the valve plug hub 26 to provide a distribution of forces uniformly throughout the shape of the ceramic valve plug seat. In particular, the valve plug seat 28 includes a dome contoured plug seat surface 30, a central aperture 32 extending through the plug 28, and a plug mounting base 34. The valve plug hub 26 includes a hub mounting platform 36 which is adapted to fit within the plug mounting base 34 so that the valve plug seat 28 is readily supported on the valve plug hub 26. The hub mounting platform 36 includes a hub aperture 38 to assist in the secure mounting of the valve plug seat 28 to the valve plug hub 26.

As is illustrated most clearly in the exploded view of FIG. 3, the plug central aperture 32 includes a cone-shaped plug interior surface portion 40. A threaded mounting bolt 42 includes a socket head 44 and an elongated shank extending from the head. The shank includes a threaded end portion 46 and a tapered surface portion 48 intermediate to the threaded end portion 46 and the socket head 44. The tapered surface portion 48 of the mounting bolt 42 is adapted to match the contour of the cone-shaped plug interior surface portion 40 within the ceramic plug seat 28.

Because the valve plug hub 26 is normally formed of a hard metal, such as stainless steel or other such alloy which is difficult to thread, there is provided a softer metal insert 50 having internal threads which is then welded inside of the hub aperture 8. For convenience the insert 50 shown in FIG. 2 is not shown in FIG. 3.

Assembling of the components is provided by inserting the mounting bolt 42 with the threaded end portion 46 within the central aperture 32 and threadably engaging the bolt threaded end 46 with the threaded insert 50. Continued rotation of the bolt socket head 44 eventually places the bolt tapered portion 48 securely engaged against the cone-shaped plug interior surface portion 40 as the bolt 42 is tightened onto the valve plug hub 26. The secure connection between the bolt tapered portion 48 and the cone-shaped plug portion 40 distributes the mounting forces created by the mechanical fastening configuration uniformly through the ceramic plug. This tends to prevent cracking of the ceramic plug and thereby leads to a more reliable connection of the ceramic plug to the metal valve element and ultimately to a more reliable fluid control valve incorporating this assembly.

A protective cap 52 formed of ceramic material is mounted within the plug central aperture 32 to seal the bolt 42 from the environment. It is preferred that the protective cap 52 is constructed so as to have an interference fit with the valve plug seat 28 as the protective cap 52 is mounted into the environmentally sealing position shown in FIG. 2.

While the mechanical fastening connection for ceramic has been illustrated herein in connection with a fluid control valve, it is understood that this same tapered and cone-shaped matching surface configuration can be employed in connecting ceramic or other semi-brittle materials to metallic components in other devices. As an example, this unique connection could be utilized in fluid regulators or pumps.

The foregoing detailed description has been given for clearness of understanding only, and no unnecessary limitations should be understood therefrom, as modifications will be obvious to those skilled in the art.

What is claimed is:

1. In a fluid control valve, including a valve plug assembly having a rotatable valve shaft, a hub mounted at one valve shaft end, and a ceramic plug seat mounted to the hub and having a contoured plug seat surface, the improvement comprising:

a central bolt receiving aperture through the contoured plug seat surface and extending through the ceramic plug seat, said central bolt receiving aperture including a cone-shaped interior surface portion;

a threaded mounting bolt having a head and an elongated shank extending from the head, said shank including a threaded end portion for threadably engaging the hub and a tapered portion intermediate to the threaded end portion and the head, said tapered portion matching the cone-shaped interior surface portion within said ceramic plug seat to uniformly distribute mounting forces within the ceramic plug seat.

2. The improvement of claim 1, wherein said threaded mounting bolt includes a socket head.

3. The improvement of claim 2, including a ceramic cap insert into said central bolt receiving aperture in said ceramic plug seat to cover and seal said bolt socket head from the environment.

4. The improvement of claim 3, wherein said ceramic cap engages said ceramic plug seat in an interference fit.

* * * * *

UNITED STATES PATENT AND TRADEMARK OFFICE
Certificate

Patent No. 5,707,041

Patented: January 13, 1998

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Loren L. Bovee, Marshalltown, IA; Gary A. Witt, Sherman, TX; David J. Westwater, Albiion, IA; and Donald R. Bush, Marshalltown, IA.

Signed and Sealed this Seventeenth Day of July, 2001.

MICHAEL BUIZ
*Supervisory Patent Examiner*
Art Unit 3753